(No Model.)

E. THOMSON.
DYNAMO ELECTRIC MACHINE.

No. 476,331. Patented June 7, 1892.

WITNESSES:
J. A. Hurdle
Wm. H. Capel

INVENTOR
Elihu Thomson
BY
H. C. Townsend
ATTORNEY.

THE NORRIS PETERS CO., PHOTO-LITHO., WASHINGTON, D. C.

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

DYNAMO-ELECTRIC MACHINE.

SPECIFICATION forming part of Letters Patent No. 476,331, dated June 7, 1892.

Application filed October 14, 1889. Serial No. 327,009. (No model.)

*To all whom it may concern:*

Be it known that I, ELIHU THOMSON, a citizen of the United States, and a resident of Lynn, in the county of Essex and State of Massachusetts, have invented a certain new and useful Dynamo-Electric Machine, of which the following is a specification.

My invention relates to the organization of an alternating-current dynamo-machine or induction-generator supplying alternating currents to two or more circuits.

The object of my invention is to increase the capacity of the machine, while at the same time doing away with the dead-point in the rotation of the usual armature having a single circuit where the phase of current is zero and obtaining a substantial uniformity in the resistance to rotation of the armature.

While my invention permits the production in separate circuits of two sets of alternating currents whose phases differ a quarter of a wave length, or thereabout, in position, it produces, also, the substantial advantage of getting more work out of an armature and field of given size in an alternating-current machine without producing fluctuations of resistance to rotation or marked magnetic fluctuations or vibrations.

My invention consists in providing the armature of an alternating-current dynamo or induction apparatus with two or more coils or sets of coils whose positions with respect to the magnetic field are such that the wire of one is subjected to its greatest magnetic influences while the other coil is not receiving induction, in combination with collectors or rings or connections from the armature-wires, whereby two waves of currents may be fed to different circuits outside of the machine from said coils, respectively, such waves not coinciding in period, but being displaced one-quarter of a wave length. There are very many constructions which will permit my invention to be practiced; but I will illustrate only one of these in the figures.

Figure 1:
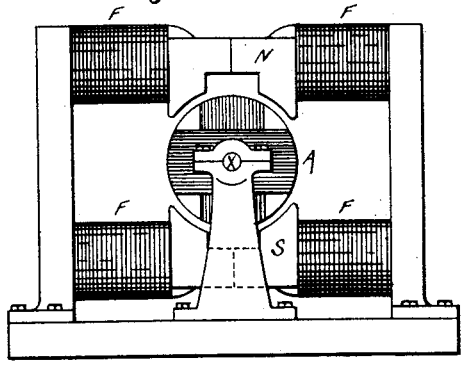
Figure 2:
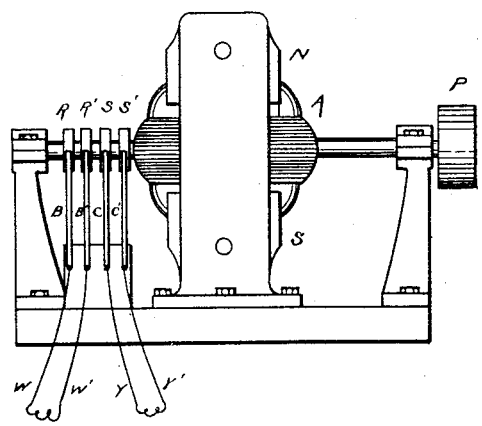
Figure 3:
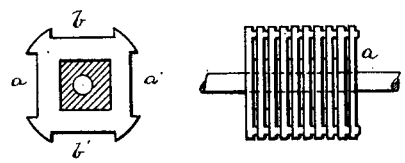
Figure 4:
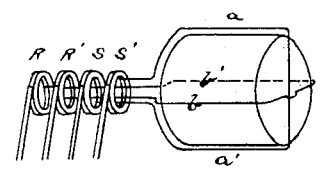
Figure 5:
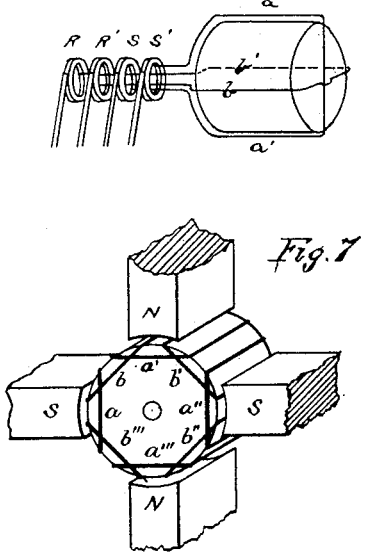
Figure 6:
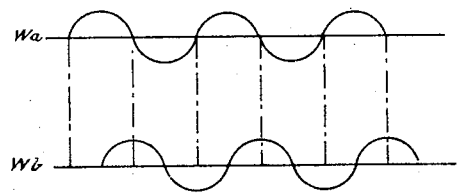
Figure 7:
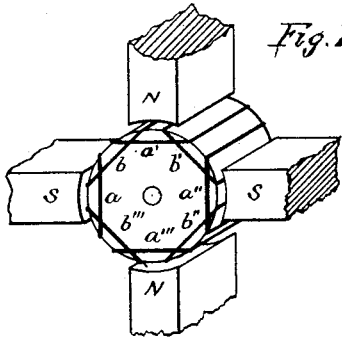

In the accompanying drawings, Figure 1 shows an elevation of a machine embodying my invention, the shaft being seen on end. Fig. 2 is a view at right angles to Fig. 1 with the connections. Figs. 3 and 4 show one of the ways of building up the armature-core, although it may be constructed in any other desired way, for the reception of two sets of coils displaced in position. Fig. 5 is a diagram showing the relation of the windings around the core. The coils, however, may be replaced by any other winding bearing the same relation to the magnetic inductions. Fig. 6 is a diagram showing the positions relatively of one and the other waves of current generated in the two windings in their passage through the magnetic field. Fig. 7 illustrates a modification in the construction of machine that may be used in carrying out my invention.

In Fig. 1, N S are magnet-poles magnetized in any suitable way, as by coils on the magnet-frame F F F F put into a circuit.

A is a revolving armature moving in front of the field-poles on a suitable shaft mounted on bearings, as at X. The armature, it will be seen, has two windings, one of which in the position shown has its plane at right angles to the center line of the magnetic field in which it revolves when the other is in a position intermediate thereto—that is, one coil is in a position to include magnetic lines at the same time that the other coil is in a position not to include magnetic lines in the magnetic field to which they are subjected. The terminals of the armature-coils are separately carried to rings R R′ S S′ on the shaft, as in Fig. 2. These rings are otherwise insulated from each other and from the shaft by preference, so that the circuits are substantially two separate circuits. Collecting-brushes B B′ C C′, bearing on the insulated metallic rings R R′ S S′, serve to convey off the current to the working circuits, wires leading to which are represented by $w$ $w'$ $y$ $y'$. It will be understood that with more than two field-poles N S, as in a multipolar dynamo, the number of coils on the armature would be correspondingly increased, or at least a number of sections of each winding would be correspondingly increased to take advantage of the effect of each field-pole. This is, however, well understood in the art and need not be described. It will also be understood that the field-magnet system itself may revolve while the armature-coils are stationary, in which case the collector-rings may be dispensed with and direct connections made to the external circuits $w$ $w'$ $y$ $y'$, my invention being limited not to any one of these particulars, but to the arrangement in an inductive system of two windings displaced relatively to one another in relation to the inductive field, so that one winding is influenced just before the other, and whereby two alternating impulses are delivered to two separate external circuits, the wave periods of which are displaced so as to overlap in such manner that the points of neutrality of one wave or the points of no electro-motive force in one wave correspond in time to the points of activity in the other wave of current. The circuits fed from the two coils with alternating currents may contain any device or devices adapted to consume the energy of alternating electric currents. It will be understood that in alternating-current-generating machines where bobbins or coils are revolved in front of magnets or in a magnetic field and only a single circuit is to be obtained on a single-coil system there are points during revolution which are the zero-points of the alternating waves at which no resistance to rotation takes place, because no power is being consumed, the magnetic force resisting rotation being only present when the current is flowing in the coil-circuit. By the additional winding which I use in my invention I utilize what would otherwise be lost space on the armature, and I produce a machine which while it is still an alternating machine has at all times an almost uniform resistance to rotation, because one armature-coil system resists rotation at its maximum, while the other armature-coil system is at its minimum or zero point of current.

Fig. 3 shows one of the laminæ, of which the armature-core (shown in Fig. 1) is composed—namely, a sort of hollow square with projections on its corners—the armature-core itself being built up, as seen in Fig. 4, of a number of these laid side by side at right angles to the axis and securely fastened thereto.

I make no claim to this construction of armature-core, as it is merely illustrative of the manner of obtaining a core which will give spaces for the winding of two coils at right angles where but two field-poles are used, or, in other words, a winding of the wire which will suit the conditions of my invention. The spaces $a$ $a'$, Fig. 3, would receive one coil and the spaces $b$ $b'$ the other coil.

Fig. 5 shows diagrammatically by a single turn the relation of the winding, where $a$ $a'$, connected to rings S S', alternate in position on the armature with the wires $b$ $b'$, connected to the rings R R'.

Fig. 6 shows a wave $wa$, which is produced by the coil $a$ $a'$, for example, and the wave $wb$, which is produced simultaneously by the coil $b$ $b'$, the position of these waves relatively to one another being such that the maximum points of one wave correspond to the zero-points of the other wave, either exactly or only approximately. This is the gist of my invention, and I deliver these two waves to two separate external circuits, and thereby utilize the magnetic field continuously for the generation of current at the same time that alternating currents are delivered.

My invention, as I have stated, is capable of being operated on a more expanded scale by increasing the number of field-poles by winding numerous armature-bobbins in two systems, whereby they are in the proper definite relation to the magnetic field.

I have indicated in Fig. 7 four field-magnet poles N S N S surrounding the armature, upon which have been placed two systems of coils, one system of coils consisting of coils $a$ $a'$ $a''$ $a'''$, which are simultaneously acted upon to the same degree by the magnetism of the field, while the other system $b$ $b'$ $b''$ $b'''$ is also acted upon, but at an interval between the maximum action on the other system. The coils of one system may be connected together in series or multiple for the external work-circuit, giving one of the waves, and the other system may be connected together similarly in series or multiple to give the other displaced or intermediate wave, the terminals being, as before, carried out in any desired way, as by collecting-rings.

It will be understood that each of the alternating circuits may be led out to work-circuits in which incandescent lamps or other devices are placed in multiple arc or series. It will also be understood that each of the circuits may feed primary coils in multiple of induction-coils systems whose secondaries are used to run incandescent lamps in multiple or two alternating-current circuits, being therefore in a measure independent of one another, though not perfectly so.

What I claim as my invention is—

1. In a magnetic induction-generator, such as a dynamo-electric machine, supplying alternating currents, an induced portion or armature-winding consisting of two coils or sets of coils relatively displaced in their magnetic field or fields and insulated from one another on the armature, with the position of maximum activity in one coil or set of coils coincident or approximately coincident with the position of non-activity of the other coil or set of coils, in combination with two separate work-circuits connected, respectively, with said coils or sets of coils, so as to be supplied with alternating currents from such coils independently.

2. The combination, substantially as described, in a magnetic induction-generator or dynamo-electric machine supplying alternating currents, of a set of field-magnet poles, two sets of coils electrically independent, but disposed thereon, and insulated from one another on the armature, so as to be acted upon with maximum power at intervals such that the maximum points of current in one set corresponds to the zero or minimum in
5 the other, and separate work-circuits supplied with alternating currents from said sets of coils, respectively.

Signed at Lynn, in the county of Essex and State of Massachusetts, this 9th day of October, A. D. 1889.

ELIHU THOMSON.

Witnesses:
J. WESLEY GIBBONEY,
A. L. ROHRER.